United States Patent [19]

Yonehara et al.

[11] Patent Number: 4,910,252

[45] Date of Patent: Mar. 20, 1990

[54] SILOXANE POLYMER ANTIFOULING PAINT COMPOSITION CONTAINING POLYSILOXANES

[75] Inventors: Yoiti Yonehara; Kiyoshi Nanishi, both of Hiratsuka, Japan

[73] Assignee: Kansai Paint Co., Ltd., Hyogo, Japan

[21] Appl. No.: 232,537

[22] Filed: Aug. 15, 1988

Related U.S. Application Data

[63] Continuation of Ser. No. 882,532, Jul. 7, 1986, abandoned.

[51] Int. Cl.$^4$ .................. C08K 5/54; C09D 5/14; C09D 5/16
[52] U.S. Cl. .................................. 524/730; 524/731; 526/279
[58] Field of Search ............... 526/279; 525/477, 478; 524/730, 731

[56] References Cited

U.S. PATENT DOCUMENTS 4,413,102  11/1983  Tanaka et al. .................. 525/453
4,564,557  1/1986  Ohgushi et al. .................. 526/279

FOREIGN PATENT DOCUMENTS 57-96044   6/1982  Japan .................. 523/122
60-258271 12/1985  Japan .................. 523/122

Primary Examiner—Joseph L. Schofer
Assistant Examiner—Peter F. Kulkosky
Attorney, Agent, or Firm—Wenderoth, Lind & Ponack

[57] ABSTRACT

An antifouling paint composition comprising as a film-forming component a vinyl-type copolymer obtained by copolymerization of
(A) 1 to 50% by weight of a specific polymerizable unsaturated polysiloxane compound,
(B) 0 to 30% by weight of a specific polymerizable unsaturated alkoxysilane compound, and
(C) 20 to 99% by weight of a polymerizable unsaturated vinyl monomer other than the compounds (A) and (B) above.

12 Claims, No Drawings

SILOXANE POLYMER ANTIFOULING PAINT COMPOSITION CONTAINING POLYSILOXANES

This is a continuation of application Ser. No. 882,532, filed Jul. 7, 1986.

This invention relates to an antifouling paint composition, and more specifically, to a nontoxic antifouling paint composition designed to prevent adhesion of aquatic organisms to the submerged parts of ships and marine structures.

Heretofore, paints containing cuprous oxide or organotin compounds have been coated on the submerged parts of ships or marine structures with significant effects of preventing adhesion of aquatic organisms. However, since toxic substances such as copper compounds or organotin compound dissolve from the coatings and cause environmental pollution, it has been desired to develop nontoxic antifouling paints free from toxicants such as copper compounds or organotin compounds.

Nontoxic antifouling paints have previously been suggested as seen, for example, from Woods Hole Oceanographic Institution: "Marine Fouling and Its Prevention", Annapolis, Maryland, U.S. Naval Institute (1952) which suggests a possibility of paraffins or waxes being used as a nontoxic antifouling paint, or R. E. Baier, "Prospect for Nontoxic Fouling Resistant Paints", Proc. Annu. Conf. Mar. Technology Soc. (1973) which suggests that fouling resitance can be imparted to the surface of a substrate by providing a coated layer containing both methyl and hydroxyl groups.

U.S. Pat. Nos. 3702778, 4098925, and 4234340 disclose nontoxic antifouling paints which, however, are inferior to the conventional paints containing cuprous oxide or organotin compounds and are still desired to be improved.

The present inventors have therefore worked extensively in order to develop a nontoxic antifouling paint which does not contain a toxicant such as a metal compound or an organometal compound, the cause of environmental pollution, and has antifouling property comparable to conventional antifouling paints containing such toxicants. As a result, they have found that the tendency of aquatic organisms to adhere to paint films is smaller when the coated films have a lower surface energy or contain less polar components, or when water droplets dropped onto the surfaces of the paint films easily fall off the films, and that in such situations, aquatic organisms which may adhere to the coated films adhere only with a weak adhesion force. The inventors have developed a specific film-forming component which takes advantage of this fact.

Thus, according to this invention, there is provided an antifouling paint composition comprising as a film-forming component a vinyl-type copolymer obtained by copolymerization of (a) 1 to 50% by weight of a polymerizable unsaturated polysiloxane compound represented by the general formula

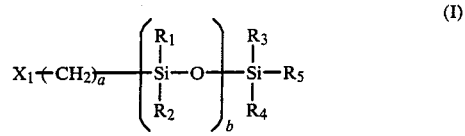

wherein
$X_1$ represents a group of the formula

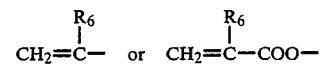

where $R_6$ represents a hydrogen atom or a methyl group;
$R_1$, $R_2$, $R_3$ and $R_4$ are identical or different and each represents an alkyl group having 1 to 4 carbon atoms, an aryl group or an aralkyl group;
$R_5$ represents an alkyl group having 1 to 4 carbon atoms, or a hydroxyalkyl group having 1 to 3 hydroxyl groups and 1 to 6 carbon atoms;
a is 0 when $X_1$ represents the group

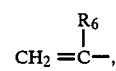

and an integer of 1 to 5 when $X_1$ represents the group

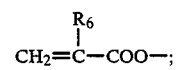

and
b is a number of 3 to 1,000,
(B) 0 to 30% by weight of a polymerizable unsaturated alkoxysilane compound represented by the general formula

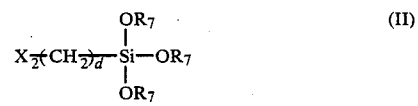

wherein
$X_2$ represents a group of the formula

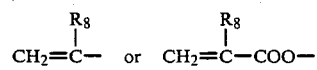

where $R_8$ represents a hydrogen atom or a methyl group;
$R_7$ represents an alkyl group having 1 to 4 carbon atoms; and
d is 0 when $X_2$ represents the group

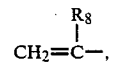

and an integer of 1 to 5 when $X_2$ represents the group

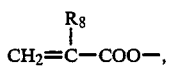

and (C) 20 to 99% by weight of a polymerizable unsaturated vinyl monomer other than the compounds (A) and (B) above.

The antifouling paint composition of this invention does not release a toxicant into water. A paint film from the composition has a low surface energy, and its surface permits easy falling off of water droplets. Hence, the paint film from the antifouling paint composition of this invention has excellent fouling resistance, and even when organisms adhere to it, they can be easily removed. The antifouling paint composition of this invention exhibits antifouling property comparable to conventional antifouling paints of the type which release toxicants such as metallic compounds or organometallic compounds.

In the present specification and claims, the "alkyl group" denotes a linear or branched alkyl group, and includes, for example, methyl, ethyl, n-propyl, isopropyl, n-butyl, sec-butyl, isobutyl, tert-butyl, n-pentyl and n-hexyl groups. The "aryl group" includes, for example, phenyl, tolyl, xylyl and naphthyl group. Examples of the "aralkyl group" are benzyl and phenethyl groups.

The principal components constituting the antifouling paint composition of this invention are specifically described below.

(A) Polymerizable unsaturated polysiloxane compound

The polymerizable unsaturated polysiloxane compound (A) which is a constituent of the vinyl-type copolymer in the antifouling paint composition of this invention is represented by the following general formula

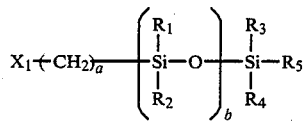

(I)

wherein $X_1$, $R_1$, $R_2$, $R_3$, $R_4$, $R_5$, a and b are as defined above. This polysiloxane compound has a polymerizable vinyl group

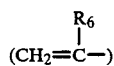

at one end.

In formula (I), $R_1$, $R_2$, $R_3$ and $R_4$ are identical or different and each represents an alkyl group having 1 to 4 carbon atoms, an aryl group or an aralkyl group. The alkyl group, especially a methyl group, is preferred because the surface of a paint film prepared from the resulting vinyl-type copolymer has the lowest surface energy.

$R_5$ represents an alkyl group having 1 to 4 carbon atoms, or a hydroxyalkyl group having 1 to 3 hydroxyl groups and 1 to 6 carbon atoms. The hydroxyalkyl group is preferred because when $R_5$ is the hydroxymethyl group, the resulting paint composition of this invention gives a coated surface containing both methyl and hydroxyl groups as suggested by R. E. Baier stated hereinabove: Examples of such a hydroxyalkyl group are hydroxymethtyl, 2-hydroxyethyl, 1-hydroxyethyl, 1,2-dihydroxyethyl, 3-hydroxypropyl, 2,3-dihydroxypropyl, 1,2,3-trihydroxypropyl, 4-hydroxybutyl, 3,4-dihydroxybutyl, 5-hydroxypentyl, 4,5-dihydroxypentyl, 4,5-dihydroxy-4-methyl-pentyl and 4,4,5-trihydroxypentyl groups.

When $X_1$ represents a group of the formula

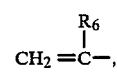

a is 0, or in other words, $X_1$ is directly bonded to Si without the intermediary of $-(CH_2)_a$. When $X_1$ represents a group of the formula

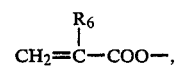

a is an integer of 1 to 5, preferably 2 to 4.

The b in formula (I) represents the average degree of polymerization of siloxane units

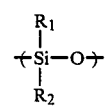

and is a number in the range of 3 to 1,000, preferably 30 to 500, more preferably 50 to 300. The average degree of polymerization is determined by gel permeation chromatography.

Specific examples of the polymerizable unsaturated siloxane compound (a) preferably used include the following compounds.

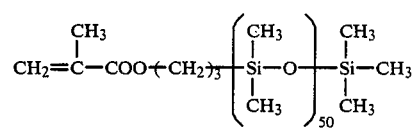
(1)

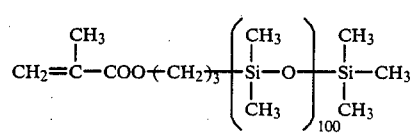
(2)

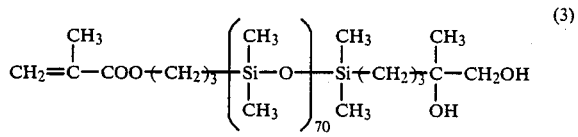
(3)

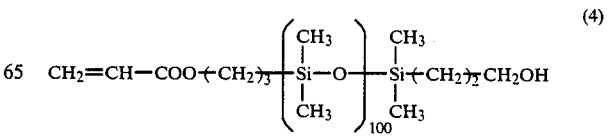
(4)

-continued

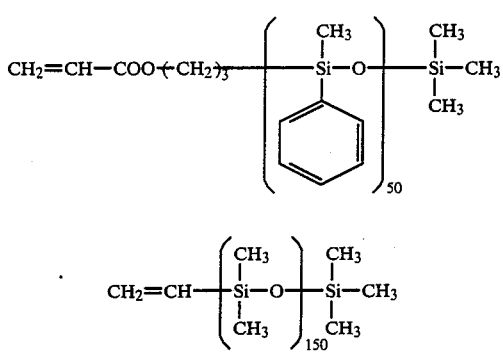

Of these, compounds (1) and (2) are preferred because of ready availability.

(B) Polymerizable unsaturated alkoxysilane compound

The unsaturated alkoxysilane compound (B) as a constituent of the vinyl-type copolymer in the paint composition of this invention is an alkoxysilane compound of the following general formula $$X_2\text{-}(CH_2)_d\text{-}Si\begin{array}{c}OR_7\\|\\|\\OR_7\end{array}OR_7 \quad (II)$$

wherein $X_2$, $R_7$ and d are as defined above, and containing a polymerizable vinyl group

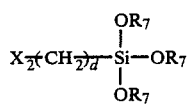

In formula (II), the $C_1$–$C_4$ alkyl group represented by $R_7$ is preferably a methyl group. When $X_2$ represents the group

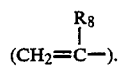

d is 0, or in other words, $X_2$ is directly bonded to Si. When $X_2$ represents the group

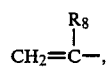

d is an integer of 1 to 5, preferably 2 to 4.

Specific examples of the polymerizable unsaturated alkoxysilane (B) represented by formula (II) include vinyltrimethoxysilane, vinyltriethoxysilane, vinyltripropoxysilane, vinyltributoxysilane, (meth)acryloxymethyltrimethoxysilane, (meth)acryloxyethyltrimethoxysilane, (meth)acryloxypropyltrimethoxysilane, (meth)acryloxypropyltriethoxysilane, (meth)acryloxyethyltriethoxysilane, and (meth)acryloxypropyltributoxysilane. Of these, (meth)acryloxypropyltrimethoxysilane is especially preferred.

(C) Polymerizable unsaturated vinyl monomer

The polymerizable unsaturated vinyl monomer (C) other than the compounds (A) and (B), another constituent of the vinyl-type copolymer in this invention may be any vinyl monomer which polymerizes with the compound (A) and/or the compound (B) in the presence of radicals to give a film-forming polymeric substance. Generally, the monomer (C) is preferably a compound having 1 or 2 (preferably 1) radical-polymerizable alpha,beta-ethylenically unsaturated bond.

Typical examples of the polymerizable unsaturated vinyl monomer (C) are given below.

(a) ($C_1$–$C_{12}$ Alkyl) esters of (meth)acrylic acid such as methyl (meth)acrylate, ethyl (meth)acrylate, propyl (meth)acrylate, isopropyl (meth)acrylate, butyl (meth)acrylate, hexyl (meth)acrylate, 2-ethylhexyl (meth)acrylate, octyl (meth)acrylate and lauryl (meth)acrylate.

(b) Hydroxy($C_{2-6}$ alkyl) esters of (meth)acrylic acid such as 2-hydroxyethyl (meth)acrylate and 2-hydroxypropyl (meth)acrylate.

(c) Glycidyl-containing vinyl monomers such as glycidyl (meth)acrylate and allyl glycidyl ether.

(d) Carboxy-containing vinyl monomers such as (meth)acrylic acid, itaconic acid and crotonic acid.

(e) ($C_{2-6}$ Alkenyl) esters of (meth)acrylic acid such as allyl (meth)acrylate.

(f) Vinyl aromatic compounds such as styrene, alpha-methylstyrene and vinyltoluene.

(g) Other vinyl monomers such as (meth)acrylonitrile, (meth)acrolein, butadiene and isoprene These polymerizable unsaturated vinyl monomers may be used singly, or in combination with each other. Especially preferred among the above vinyl monomers are ethyl (meth)acrylates, butyl (meth)acrylate, 2-hydroxyethyl (meth)acrylate and styrene.

Copolymerization

The polymerizable unsaturated polysiloxane compound (A), the polymerizable unsaturated alkoxysilane compound (B) and the polymerizable unsaturated vinyl monomer (C) are copolymerized with one another to form the vinyl-type copolymer in accordance with this invention. The proportions of the components (A), (B) and (C) may be set as follows.

| Component | General range (wt. %) | Preferred range (wt. %) | Most preferred range (wt. %) |
|---|---|---|---|
| (A) | 1–50 | 5–30 | 8–20 |
| (B) | 0–30 | 3–15 | 5–10 |
| (C) | 20–99 | 55–92 | 70–87 |

The weight percents (wt.%) of these components are based on the total weight of the three components (A), (B) and (C).

The copolymerization can be carried out by a radical polymerization method known per se in an inert organic solvent. Examples of the organic solvent that can be used in the copolymerization include esters such as ethyl acetate and butyl acetate; aromatic hydrocarbons such as benzene, toluene and xylene; ketones such as methyl ethyl ketone and methyl isobutyl ketone; alcohols such as isopropanol and butanol; and mixtures of two or more of these solvents. Radical polymerization initiators normally used in radical polymerization, for example benzoyl peroxide, azobisisobutyronitrile, lauroyl peroxide and cumene hydroperoxide, may be used in the copolymerization reaction.

The copolymerization reaction may be carried out at a temperature of about 80° to about 200° C., preferably about 100° to about 120° C., and can be terminated in 2 to 20 hours, preferably 5 to 10 hours, at these temperatures.

Advantageously, the vinyl-type copolymer produced by the above procedure generally has a weight average molecular weight ($\overline{M}_w$) of about 3,000 to about 200,000, preferably about 5,000 to about 100,000, and a glass transition temperature (Tg) of −30° to 100° C., preferably −10° to 30° C.

Preparation of the paint composition

The paint composition of this invention can be prepared by dissolving or dispersing the vinyl-type copolymer so produced in a suitable solvent.

Solvents that are relatively volatile at ordinary temperature may be used for the preparation of the paint composition. Examples include ketones such as acetone and methyl ethyl ketone; esters such as ethyl acetate and butyl acetate; aromatic hydrocarbons such as benzene, toluene and xylene; alcohols such as isopropanol and butanol; petroleum solvent such as mineral spirit and aromatic petroleum naphtha; and mixtures of two or more of these solvents.

In addition to the vinyl-type copolymer, a siloxane compound having primary hydroxyl groups at both ends and represented by the following general formula

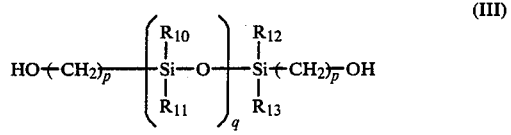
(III)

wherein
$R_{10}$, $R_{11}$, $R_{12}$ and $R_{13}$ are identical or different and each represents an alkyl group having 1 to 4 carbon atoms, an aryl group or an aralkyl group;
p is an integer of 1 to 5; and
q is a number of 3 to 1,000,
may be incorporated in the paint composition of this invention. This can further increase the antifouling property of the composition.

Preferably in formula (III), $R_{10}$, $R_{11}$, $R_{12}$ and $R_{13}$ each represent a methyl group, p is in the range of 2 to 4, and q, which represents the average degree of polymerization of siloxane units, is 30 to 500, especially 50 to 300.

Specific examples of the siloxane compounds of formula (III) are given below.

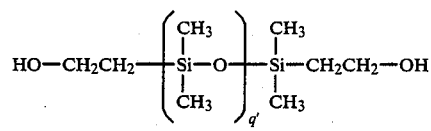

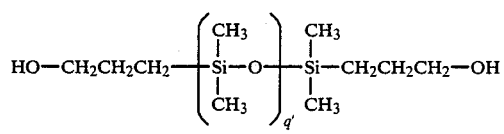

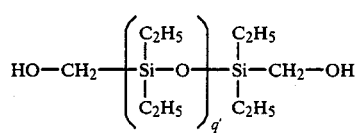

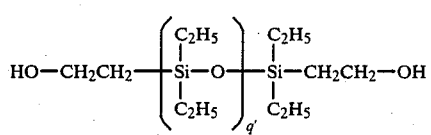

-continued

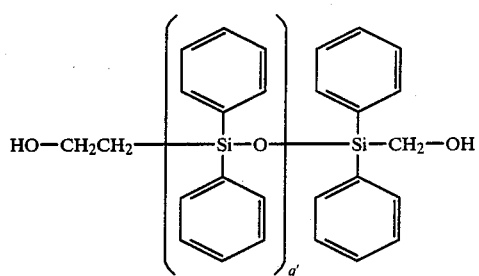

$q' = 30-500$

Conveniently, the siloxane compound of formula (III) is included in an amount of generally 1 to 50 parts by weight, preferably 5 to 30 parts by weight, more preferably 8 to 20 parts by weight, per 100 parts by weight of the vinyl copolymer.

If further required, ordinary paint additives may be incorporated in the paint composition of this invention in amounts generally used. Examples of the paint additives are colored pigments such as red iron oxide, zinc oxide and chrome yellow, body extender pigments such as talc, clay and calcium carbonate, anticorrosive pigments such as red lead, zinc chromate and lead chromate, plasticizers such as tricresyl phosphate, chlorinated paraffin and phthalates, and antisagging agents such as finely divided silica, aluminum stearate and zinc stearate.

The antifouling paint composition of this invention may be prepared by mixing and dispersing the aforesaid components in a solvent by means of a dispersing device such as a ball mill and an attriter.

The amount of the vinyl-type copolymer in accordance with this invention is not strictly limited, and can be varied widely according to the type of a substrate to be coated by the paint composition or the site at which the substrate is located. Generally, it may be 15 to 70% by weight, preferably 30 to 50% by weight, based on the weight of the composition.

Utility

The antifouling paint composition provided by this invention gives a paint film having a low sliding friction angle and a low critical surface tension and therefore having excellent resistance to the adhesion of aquatic organisms. Its antifouling property is equivalent to, or higher than, that of a conventional antifouling paint of the type which releases a toxicant such as a metallic compound or an organometallic compound. In addition, the antifouling paint composition of this invention is very superior also as a nontoxic antifouling paint which permits easy removal of aquatic organisms that have adhered to the paint film.

The antifouling composition of this invention can be used for coating the submerged parts of various ships and underwater and overwater structures such as cutting rigs, harbor docks, water gates and buoys.

The following examples illustrate the present invention further. It should be understood however that the invention is not limited to these examples alone, and various changes and modifications are possible without departing from the scope of the invention. In these examples, all parts and percentages are by weight unless otherwise specified.

PRODUCTION EXAMPLE 1

Production of a vinyl-type copolymer:

In a reaction vessel, 20 parts of methacryloxypropyl-polydimethylsiloxane of the following formula

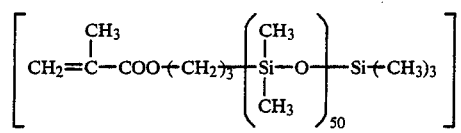

40 parts of methyl methacrylate and 40 parts of n-butyl methacrylate were dissolved in a 8:2 mixture of xylene and 40 parts of methyl methacrylate and 40 parts of n-butyl methacrylate were dissolved in a 8:2 mixture of xylene and butyl acetate, and 1.0 part of benzoyl peroxide was added. With stirring, the mixture was maintained at 90° to 100° C. for 6 hours to give a solution of a vinyl-type copolymer having a Tg of 20° C. and a weight average molecular weight of 30,000 in a solids concentration of 60%.

PRODUCTION EXAMPLE 2

Production of a vinyl-type copolymer:

In a reaction vessel, 20 parts of methacryloxypropyl 4,5-dihydroxy-4-methylpentylpolydimethylsiloxane of the following formula

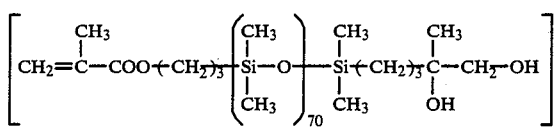

20 parts of methacryloxypropyltrimethoxysilane, 40 parts of isobutyl acrylate and 20 parts of styrene were dissolved in 67 parts of a 8:2 mixture of xylene and butyl acetate, and 0.5 part of azobisisobutyronitrile was added. With stirring, the mixture was maintained at 90° to 100° C. for 6 hours to give a solution of a vinyl-type copolymer having a Tg of −10° C. and a weight average molecular weight of 45,000 in a solids concentration of 60%.

PRODUCTION EXAMPLE 3

Production of a vinyl-type copolymer:

Thirty parts of methacryloxypropylpolydimethysiloxane used in Production Example 1, 30 parts of methacryloxypropyltrimethoxysilane and 40 parts of t-butyl methacrylate were polymerized by the same method as in Production Example 1 to give a solution of a vinyl-type copolymer having a Tg of 30 and a weight average molecular weight of 30,000 in a solids concentration of 60%.

PRODUCTION EXAMPLE 4

Production of a vinyl-type copolymer:

In a reaction vessel, 30 parts of acryloxypropyl-polydimethylsiloxane of the formula

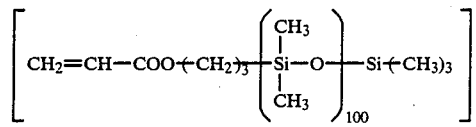

10 parts of acryloxypropyltriethoxysilane, 30 parts of t-butyl methacrylate and 30 parts of isobutyl methacrylate were dissolved in 67 parts of an 8:2 mixture of xylene and butyl acetate, and 1.0 part of azobisisobutyronitrile was added. The mixture was maintained at 100° to 110° for 6 hours to give a solution of a vinyl-type copolymer having a Tg of 14° C. and a weight average molecular weight of 30,000 in a solids concentration of 30%.

EXAMPLE 1

Eighty parts of the vinyl-type copolymer solution obtained in Production Example 1, 0.5 part of Aerosil #200 (fine powder of silica produced by Degussa Company, West Germany and 19.5 parts of xylene were mixed and dispersed by a paint conditioner to give an antifouling composition of this invention. A paint film prepared from it was tested for properties, and the results are shown in Table 2 below.

EXAMPLES 2-8

In each run, an antifouling paint composition was prepared as in Example 1 in accordance with the mixing proportions shown in Table 1. The results of testing paint film properties are shown in Table 2.

TABLE 1

| Materials | Example | | | | | | | |
|---|---|---|---|---|---|---|---|---|
| | 1 | 2 | 3 | 4 | 5 | 6 | 7 | 8 |
| Vinyl-type copolymer solution of Production Example 1 | 80.0 | | | | 70.0 | | | |
| Vinyl-type copolymer solution of Production Example 2 | | 80.0 | | | | 60.0 | | |
| Vinyl-type copolymer solution of Production Example 3 | | | 80.0 | | | | 50.0 | |
| Vinyl-type copolymer solution of Production in Example 4 | | | | 80.0 | | | | 75.0 |
| Silicone oil (*1) | | | | | 8.0 | 4.0 | | |
| OH-containing silicon compound (*2) | | | | | | 14.0 | 16.0 | 3.0 |
| Aerosil #200 | 0.5 | 0.5 | 0.5 | 0.5 | 0.5 | 0.5 | 0.5 | 0.5 |
| Xylene | 19.5 | 19.5 | 9.5 | 19.5 | 21.5 | 25.5 | 14.5 | 21.5 |
| Methyl isobutyl ketone | | | 10.0 | | | | 15.0 | |
| Total (parts) | 100.0 | 100.0 | 100.0 | 100.0 | 100.0 | 100.0 | 100.0 | 100.0 |

TABLE 1-continued

| Materials | Example | | | | | | | |
|---|---|---|---|---|---|---|---|---|
|  | 1 | 2 | 3 | 4 | 5 | 6 | 7 | 8 |

(*1) $CH_3-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_{50}-\underset{\underset{CH_3}{|}}{\overset{\overset{CH_3}{|}}{Si}}-CH_3$ (*2) $HO-(CH_2)_3-\left(\underset{\underset{CH_3}{|}}{\overset{\overset{CH_3}{|}}{Si}}-O\right)_{50}-\underset{\underset{CH_3}{|}}{\overset{\overset{CH_3}{|}}{Si}}-(CH_2)_3-OH$

COMPARATIVE EXAMPLES 1–4

Antifouling paint compositions were prepared in accordance with the following formulations, and the results of testing paint film properties are shown in Table 2.

|  | Parts |
|---|---|
| Comparative Example 1 |  |
| Vinyl chloride resin | 10.0 |
| Rosin | 10.0 |
| Tricresyl phosphate | 4.0 |
| Triphenyltin fluoride | 10.0 |
| Talc | 5.0 |
| Red iron oxide | 5.0 |
| Xylene | 28.0 |
| Methyl isobutyl ketone | 28.0 |
| Total | 100.0 |
| Comparative Example 2 |  |
| Chlorinated rubber resin | 5.0 |
| Rosin | 15.0 |
| Tricresyl phosphate | 4.0 |
| Cuprous oxide | 30.0 |
| Talc | 5.0 |
| Baryta | 3.0 |
| Red iron oxide | 4.0 |
| Xylene | 34.0 |
| Total | 100.0 |
| Comparative Example 3 |  |
| Vinyl chloride resin | 5.5 |
| Rosin | 5.5 |
| Tricresyl phosphate | 2.0 |
| Cuprous oxide | 30.0 |
| Triphenyltin hydroxide | 10.0 |
| Barium sulfate | 4.0 |
| Talc | 11.0 |
| Red iron oxide | 10.0 |
| Xylene | 11.0 |
| Methyl isobutyl ketone | 11.0 |
| Total | 100.0 |
| Comparative Example 4 |  |
| Air-drying silicone resin | 50 |
| Xylene | 50 |
| Total | 100 |

Paint film property tests

A sand-blasted steel panel, 100×300×2 mm in size, was coated with a zinc-epoxy type shop primer (dry film thickness 15 microns) and an epoxy-type anticorrosive paint (dry film thickness 200 microns). Then, each of the paint compositions obtained in Examples 1 to 8 and Comparative Examples 1 to 4 was coated on the so-treated steel panel to a dry film thickness of 50 microns. The coated panel was dried for 7 days and then used in the following tests.

(1) Test of sliding friction of a water droplet

A water droplet (0.03 ml) was placed on the paint film. One end of the paint film was gradually lifted, and the angle of the coated sheet at the time when the water droplet began to slide was measured.

(2) Measurement of the critical surface tension

The contact angles of water and paraffin in droplets were measured, and the critical surface tension of the coated surface was determined.

(3) Antifouling property test

The above test steel panel was immersed for 12 months in Toba Bay, Mie Prefecture, Japan, and the state of adhesion of organisms was examined. The numerical figures indicated in Table 2 are the percent area of adhesion.

The results given in Table 2 show that the antifouling paint composition of this invention had performance comparable to conventional paints containing cuprous oxide and organotin.

TABLE 2

|  |  | Sliding friction angle (degrees) | Critical surface tension (dyne/cm) | Antifouling property | |
|---|---|---|---|---|---|
|  |  |  |  | Green laver | Barnacle |
| Example | 1 | 40 | 23.0 | 5 | 0 |
|  | 2 | 20 | 20.5 | 0 | 0 |
|  | 3 | 28.6 | 25.0 | 10 | 0 |
|  | 4 | 25.3 | 21.8 | 1 | 0 |
|  | 5 | 42 | 20.5 | 0 | 0 |
|  | 6 | 12 | 18.4 | 0 | 0 |
|  | 7 | 19 | 22.0 | 3 | 0 |
|  | 8 | 24 | 23.5 | 0 | 0 |
| Comparative Example | 1 | 55 | 30.4 | 30 | 0 |
|  | 2 | 45 | 32.1 | 5 | 2 |
|  | 3 | 45 | 33.4 | 0 | 0 |
|  | 4 | 60 | 18.8 | 10 | 30 |

The results given in Table 2 show that the antifouling compositions of this invention showed properties comparable to conventional paints containing cuprous oxide or organotin.

What is claimed is:

1. An antifouling paint composition comprising as a film-forming component a vinyl-type copolymer obtained by copolymerization of (A) 1 to 50% by weight of a polymerizable unsaturated polysiloxane compound represented by the formula

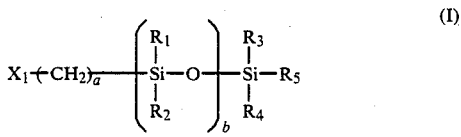

wherein
$X_1$ represents a group of the formula

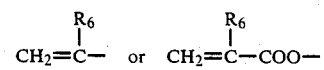

where $R_6$ represents a hydrogen atom or a methyl group;

$R_1$, $R_2$, $R_3$ and $R_4$ are identical or different and each represents an alkyl group having 1 to 4 carbon atoms, an aryl group or an aralkyl group;

$R_5$ represents a hydroxyalkyl group having 1 to 3 hydroxyl groups and 1 to 6 carbon atoms;

a is 0 when $X_1$ represents the group

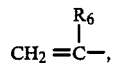

and an integer of 1 to 5 when $X_1$ represents the group

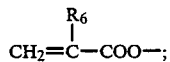

and b is a number of 3 to 1,000, (B) 0 to 30% by weight of a polymerizable unsaturated alkoxysilane compound represented by the formula

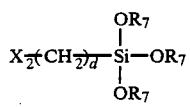

wherein $X_2$ represents a group of the formula

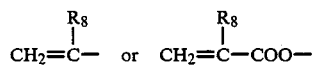

where $R_8$ represents a hydrogen atom or a methyl group;

$R_7$ represents an alkyl group having 1 to 4 carbon atoms; and d is 0 when $X_2$ represents the group

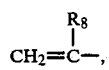

and an integer of 1 to 5 when $X_2$ represents the group

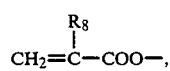

and (C) 20 to 99% by weight of a polymerizable unsaturated vinyl monomer other than the compounds (A) and (B) above, and further comprising 1 to 50 parts by weight, per 100 parts by weight of the vinyl-type copolymer, of a siloxane compound represented by the formula:

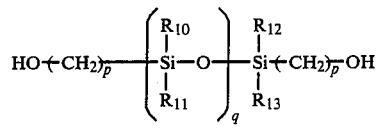

wherein $R_{10}$, $R_{11}$, $R_{12}$ and $R_{13}$ are identical or different, and each represents an alkyl group having 1 to 4 carbon atoms, an aryl group or an aralkyl group;

p is an integer of 1 to 5; and q is a number of 3 to 1,000 "and said composition being free of silanol-containing compounds".

2. The composition of claim 1 wherein the polymerizable unsaturated polysiloxane compound (A) is a compound of formula (I) in which $R_1$, $R_2$, $R_3$ and $R_4$ each represent a methyl group, and b is a number of 30 to 500.

3. The composition of claim 1 wherein the polymerizable unsaturated alkoxysilane compound (B) is selected from vinyltrimethoxysilane, vinyltriethoxysilane, vinyltripropoxysilane, vinyltributoxysilane, (meth)acryloxymethyltrimethoxysilane, (meth)acryloxyethyltrimethoxysilane, (meth)acryloxypropyltrimethoxysilane, (meth)acryloxypropyltriethoxysilane, (meth)acryloxyethyltriethoxysilane and (meth)acryloxypropyltributoxysilane.

4. The composition of claim 3 wherein the polymerizable unsaturated alkoxysilane compound (B) is (meth)acryloxypropyltrimethoxysilane.

5. The composition of claim 1 wherein the polymerizable unsaturated vinyl monomer (C) is a compound containing 1 to 2 radical-polymerizable alpha, betaethylenically unsaturated bonds.

6. The composition of claim 1 wherein the polymerizable unsaturated vinyl monomer (C) is selected from the group consisting of ($C_{1-12}$ alkyl) esters of (meth)acrylic acid, hydroxy($C_{2-6}$alkyl) esters of (meth)acrylic acid, glycidyl-containing vinyl monomers, carboxy-containing vinyl monomers, ($C_{2-6}$ alkenyl) esters of (meth)acrylic acid and vinyl aromatic compounds.

7. The composition of claim 6 wherein the polymerizable unsaturated vinyl monomer (C) is selected from ethyl (meth)acrylate, butyl (meth)acrylate, 2-hydroxyethyl (meth)acrylate and styrene.

8. The composition of claim 1 wherein the vinyl-type copolymer is obtained by copolymerizing 5 to 30% by weight of the polymerizable unsaturated polysiloxane compound (A), 3 to 15% by weight of the polymerizable unsaturated alkoxysilane compound (B), and 65 to 92% by weight of the polymerizable unsaturated vinyl monomer (C).

9. The composition of claim 1 wherein the vinyl-type copolymer has a weight average molecular weight in the range of about 3,000 to about 200,000.

10. The composition of claim 1 wherein the vinyl-type copolymer has a glass transition temperature in the range of $-30°$ to $100°$ C.

11. The composition of claim 12 wherein $R_{10}$, $R_{11}$, $R_{12}$ and $R_{13}$ each represent a methyl group, p is an integer of 2 to 4, and q is a number of 30 to 500.

12. The composition of claim 1 which contains the vinyl-type copolymer in a concentration of 30 to 50% by weight.

* * * * *